United States Patent Office 3,430,942
Patented Mar. 4, 1969

3,430,942
BELLEVILLE SPRING ASSEMBLY WITH ELASTIC GUIDES
James E. Webb, Administrator of the National Aeronautics and Space Administration, with respect to an invention by Louis R. Toth, Montrose, and William F. MacGlashan, Jr., Pasadena, Calif.
Filed May 17, 1967, Ser. No. 640,789
U.S. Cl. 267—1                    5 Claims
Int. Cl. F16f 1/00, 3/00

ABSTRACT OF THE DISCLOSURE

A plurality of flexible inner and outer retainers which maintain a plurality of Belleville springs, properly spaced from one another by means of grooves in the retainers within which the inner and outer peripheries of the springs are supported. The retainers are in turn supported so that under load when the inner and outer radii of the springs decrease and increase respectively, the retainers flex to accommodate such changes in dimensions within the elastic limits of the retainers.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 4257).

BACKGROUND OF THE INVENTION

Description of the prior art

In U.S. Patent No. 3,127,157, entitled, "Multiple Belleville Spring Assembly," an arrangement is disclosed in which a plurality of Belleville springs are retained, in proper spaced relationships from one another, by means of a plurality of outer retainers and a plurality of inner retainers. The outer retainers are secured against radial separation by an outer shell, while a central pin is used to retain the inner retainers from contraction. The various retainers define annular grooves which are used to support the various rings about their outer and inner peripheries.

Though such an arrangement has been found to be quite useful, due to the rigidity of the various retainers and the close fitness between the retainers and the outer shell and the central pin, close machining tolerances must be maintained when fabricating the various parts. For example, the external dimensions of the outer retainers must be carefully controlled to insure that they fit within the outer shell. Similarly, the inner retainers must be carefully machined so that the central pin fits therebetween. More importantly, the grooves in the inner and outer retainers, used to support the inner and outer peripheries of the springs, must be accurately machined with sufficient depth to provide sufficient space for the springs to expand into, when under load. Also, it has been found that even when the various parts are properly machined, dirt, corrosion and adverse thermal environments affect the overall performance of the assembly which greatly results in an increase of the hysteresis thereof.

OBJECTS AND SUMMARY OF THE INVENTION

It is therefore a primary object of the present invention to provide a new improved multiple Belleville spring assembly.

Another object is to provide a multiple Belleville spring assembly, which includes parts which need not be machined with the high tolerances, dictated by the prior art arrangements.

A further object is to provide a new multiple Belleville spring assembly which exhibits very low hysteresis characteristics.

Still a further object is the provision of a multiple Belleville spring assembly which has lower hysteresis and is less affected by adverse environments than the assembly presently known in the art.

These and other objects of the invention are achieved by providing a multiple Belleville spring assembly which incorporates elastic or flexible inner and outer retainers or guides, rather than rigid retainers as is done in the prior art. In the assembly of the present invention, each of the guides defines a spine-like axial member from which two cantilever arms extend. The outer guides, together with the outer shell define an outer annular space, into which the flexible outer guides may flex radially outwardly, when the outer dimensions of the Belleville springs supported by the outer guides increase under load. Similarly, the inner guides together with a central pin define an inner annular space into which the inner guides may flex radially inwardly, when the inner dimensions of the Belleville spring tend to decrease under load in manners well appreciated by those familiar with the art.

Due to the flexibility or elasticity of the inner and outer guides and the free spaces into which the guides may flex without friction between them and the support structure, such as the outer shell and the central pin, the grooves in the various guides may be machined with relatively loose tolerances yet provide an assembly with low hysteresis. Also, since the changes in dimensions of the springs under load are compensated for by the flexibility of the various guides, the grooves need not be machined to very accurate depths, without endangering binding between the springs and the various guides, as is the case in the assembly of the prior art.

The novel features that are considered characteristic of this invention are set forth with particularity in the appended claims. The invention will best be understood from the following description when read in connection with the accompanying drawings.

DESCRIPTION OF THE PREFERRED EMBODIMENT

Figure 1:
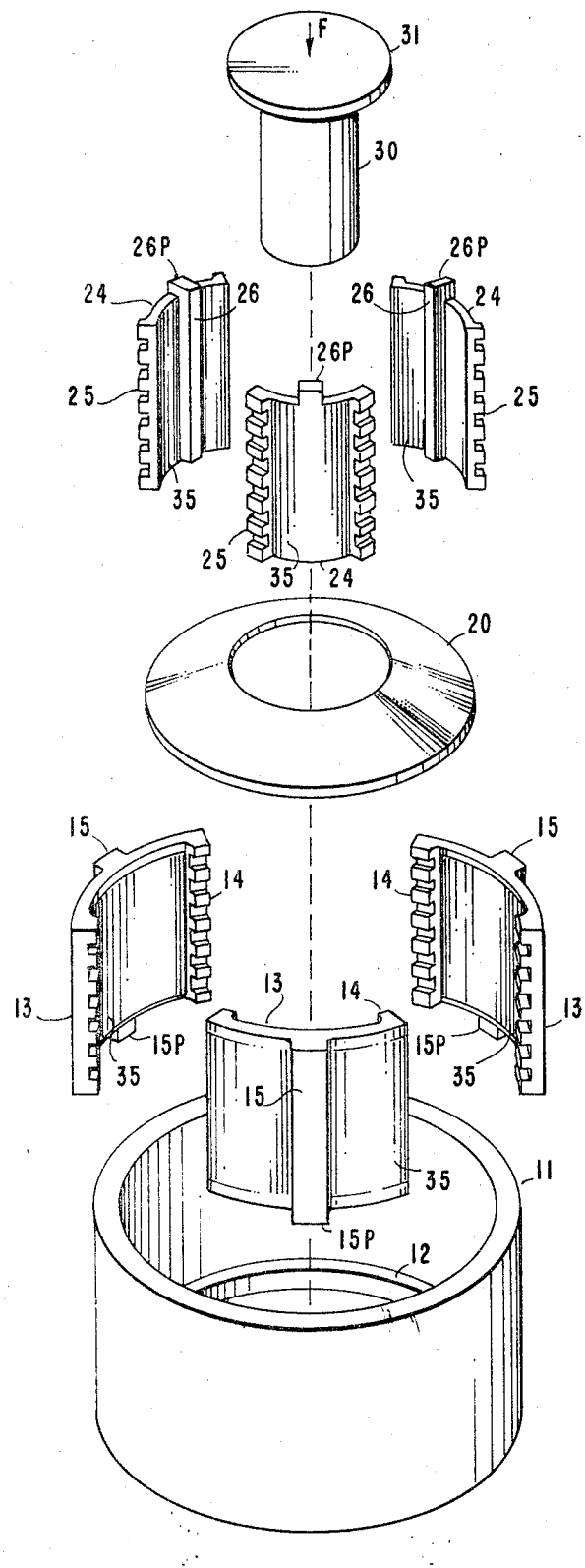
FIGURE 1 is an isometric expanded view of the various parts, forming the novel assembly.
Figure 2:
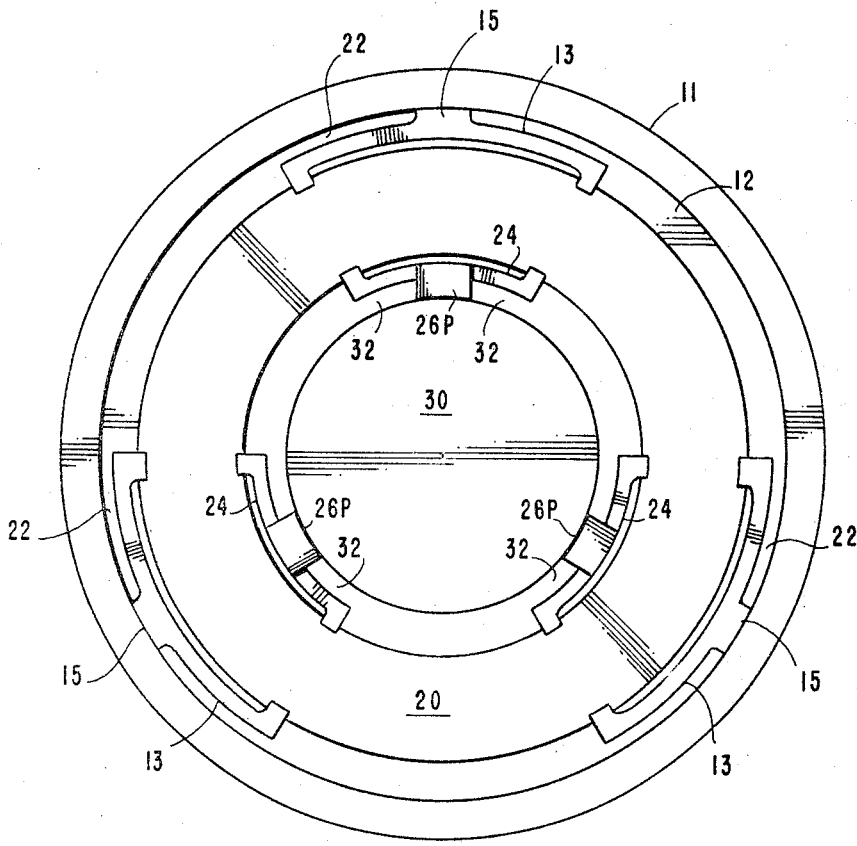
FIGURE 2 is a top cross sectional view of the guides when properly assembled.

Reference is now made to FIGURES 1 and 2 which are an exploded view and a top elevational view respectively, of the assembly of the present invention. Basically, the assembly includes an outer cylindrical shell 11, having an inturned flange 12, at one end. A plurality of outer guides 13 are slidably fitted within shell 11. Preferably, three outer guides are employed, each defining a 60° longitudinal segment of a hollow cylinder.

Each outer guide 13 is provided with equally spaced annular grooves 14 about the inner surface thereof. Preferably the grooves are limited to the longitudinal edges of the guides. Also, each guide 13 defines a spine-like member 15, which extends longitudinally along the center of the outer surface thereof. Each guide may be thought of as an elongated double cantilever, in which the spine-like member 15 forms the main structure with cantilever arms extending therefrom. When so regarding the guide, the grooves along the longitudinal edges thereof may be thought of as being defined at the edges of the two cantilever arms. At the end of each guide 13 resting on flange 12, each member 15 is machined to form a pad 15p, which extends radially from the inner surface of guide 13 to the outer surface of member 15. The function of these pads 15p is to support the guides 13 on flange 12 without frictionally engaging the arms of guides 13 on the flange so that the arms are free to flex as will be described hereafter.

Prior to being inserted in shell 11, grooves 14 receive the outer peripheries of Belleville springs 20 which, as is appreciated by those familiar with the art, are in the shape of cones, with central apertures. In FIGURE 1, although only one spring 20 is shown it should be apparent that as many as six springs may be supported by the assembly. When the guides 13 and springs 20 are placed in shell 11, the spine-like members 15 are frictionally in contact with the shell 11. However, since the members 15 extend outwardly from guides 13, the guides and the shell define an annular outer space 22. As a result, a clearance is provided between the cantilever arms of the guides 13 and shell 11. In the arrangement shown in FIGURES 1 and 2, it is assumed that the Belleville springs curve outwardly, i.e. towards the top of the assembly.

In addition, the assembly includes a plurality of inner guides 24. Just as is the case with the outer guides 13, it is preferable to use three inner guides 24, each defining a 60° segment of a hollow cylinder. Each inner guide 24 defines equally spaced annular grooves 25 on the exterior surface thereof, preferably limited to the longitudinal edges. The inner peripheries of springs 20 are secured within these grooves. As a result, each spring is supported at six points about the inner periphery thereof, as well as at six points about the outer periphery. Like the outer guides, each inner guide 24 has a spine-like member 26 extending longitudinally along the center of the inner surface thereof, so that each inner guide may be thought of as defining a double cantilever structure, with the grooves 25 machined at the edges of the two arms. An inner pin 30 is insertable between members 26 to prevent them from radial contraction under spring loading. The pin is assumed to have a cap 31 of a diameter substantially equal to the inner diameter of springs 20. Each member 26 is machined to form a pad 26p on which the cap 31 rests.

As is appreciated by those familiar with the art, when a downward force, designated in FIGURE 1 by arrow F, is applied to cap 31 of pin 30, the cap 31 applies the force to the pads 26p of guides 24, tending to place the springs 20 under load. As a result, the springs tend to flatten out and thereby increase the outer diameters or peripheries thereof, as well as decrease the inner diameters. In the assembly of the prior art, the changes in outer and inner dimensions of the springs are accommodated for by the depths of the grooves in the inner and outer guides. However, in the novel assembly of the present invention, the changes in the dimensions of the springs under load are accommodated by the flexibility or elasticity of the various guides. Under load, as the springs 20 tend to flatten out and thereby resulting in an increase in the outer peripheries thereof, the cantilever arms of guides 13 tend to flex, radially outwardly, into spaces 22. Similarly, when the springs are under load, and the inner peripheries thereof tend to decrease, i.e. the inner radii of the springs decrease, the arms of guides 24 tend to flex radially inwardly into free spaces 32, defined by the pin 30 and the inner surfaces of guides 24. Consequently, the changes in dimensions of the springs under load are accommodated by the flexing of the inner and outer guides.

The arms of the guides are designed to flex within the elastic limit of the metal from which the guides are machined. Thus, after the removal of the force to pin 30, when the Belleville springs return to their initial shape or state, the various flexible guides similarly return to their unloaded state. As a result, a spring assembly of very low hysteresis is provided. The very low hysteresis is also due to the dimensions of the inner and outer annular spaces into which the arms of the inner guides and outer guides respectively flex under load. That is, the radial dimensions of the spaces are designed so that under maximum load, the arms of the guides may flex therein without friction with either the pin 30 or the outer shell 11.

Since the flexible or elastic guides accommodate changes in dimensions of the springs under load, the grooves defined therein need not be machined with high tolerances, since the depths of the grooves no longer accommodate such dimensional changes. In practice, some preloading of the springs within the grooves of the various guides may be desirable to remove all radial play without danger of binding, i.e. deformation of the springs or guides which generally increases the system's hysteresis. Also, since the danger of binding is generally eliminated in the assembly of the present invention, the effect of dirt, corrosion, or distortion due to adverse thermal environments on the assembly's performance is eliminated or greatly minimized.

As shown in FIGURE 1, the longitudinal surface of the guides 13 and 24 defines longitudinal slots 35 on both the inner and outer surfaces thereof. These slots are advantageous in increasing the flexibility of the guides under load, yet insure that the guides return to their unloaded shapes after the Belleville springs, supported in the grooves thereof, return to their normal geometric configuration in the absence of the application of a force thereto.

There has accordingly been shown and described herein a novel multiple Belleville spring assembly, in which flexible or elastic double cantilever guides are employed. It is appreciated that those familiar with the art may make modifications and/or substitute equivalents in the arrangements as shown without departing from the true spirit of the invention.

What is claimed is:
1. A multiple Belleville spring assembly comprising:
a plurality of annular, conical Belleville springs;
a plurality of elastic outer guides, each in the form of a cylindrical longitudinal segment having a plurality of annular inturned grooves for receiving portions of the outer peripheries of said springs, each outer guide further defining a spine-like member longitudinal extending along the center of the exterior side thereof;
an outer shell in contact with the spine-like members of said outer guides securing said outer guides against radial separation, and defining an annular space between said outer means and the outer guides to enable said outer guides to radially flex therein;
a plurality of elastic inner guides, each in the form of a cylindrical longitudinal segment, having a plurality of annular grooves on the external surface thereof and a spine-like member longitudinally extending along the center of the interior side thereof, portions of the inner peripheries of said springs being engaged in the annular grooves of said elastic inner guides; and
inner removable means in contact with the spine-like members of said inner guides to secure said inner guides against radial contraction, said inner removable means and the inner sides of said inner guides defining an inner annular space to enable said inner guides to radially flex therein.

2. The assembly as recited in claim 1 wherein each of said outer guides comprises a double cantilever structure, with the spine-like member having two arms extended therefrom, said annular inturned grooves being defined at the ends of said arms.

3. The assembly as recited in claim 2 wherein each of said outer guides defines a plurality of longitudinal slots in said arms between the spine-like member and the grooves defined therein.

4. The assembly as recited in claim 1 wherein each of said inner guides comprises a double cantilever structure, with the spine-like member thereof defining a central longitudinal member having two arms extended therefrom, said annular grooves being defined at the ends of said arms.

5. The assembly as recited in claim 4 wherein each of the inner guides defines a plurality of longitudinal slots in said arms between the spine-like member and the grooves defined therein.

References Cited

UNITED STATES PATENTS

| 2,936,805 | 5/1960 | Rice | 267—1 X |
| 3,127,157 | 3/1964 | Webb | 267—1 |

DRAYTON E. HOFFMAN, *Primary Examiner.*